UNITED STATES PATENT OFFICE.

ROBERT W. LESLEY, OF PHILADELPHIA, PENNSYLVANIA.

MANUFACTURE OF HYDRAULIC CEMENT.

SPECIFICATION forming part of Letters Patent No. 305,753, dated September 30, 1884.

Application filed March 3, 1884. (No specimens.)

*To all whom it may concern:*

Be it known that I, ROBERT W. LESLEY, of the city of Philadelphia, in the county of Philadelphia and State of Pennsylvania, have invented a new and useful Improvement in the Manufacture of Hydraulic Cement, of which the following is a specification.

The hydraulic natural "home-made" cements of this country may be generally divided into quick and slow setting cements, and by color into light and dark cements. The best-known and most popular cement in the Eastern and Southern States is the Rosendale cement, which is made from argillaceous limestones found in the State of New York, and which in quality is slow-setting, and in color a rich dark brown. In Virginia, Maryland, Pennsylvania, and several other States are found cement-rocks of excellent character, producing cement of great strength, but light in color and of quick-setting quality. Many ways have been adopted for overcoming this last-mentioned difficulty, such as adding to the ground cement raw cement-rock, silicious rocks, and other materials; but these additions, which measurably reduce the quick-setting qualities, largely detract from the strength of the cement, and moreover, the cement thus treated being still light in color, is on that account excluded from any building operations where dark-colored mortar is required.

The object of my invention is by the addition of ferruginous earth or stones, such as are used in the manufacture of the mineral browns and red paints of commerce, and are found in Lehigh and Northampton counties, Pennsylvania, to convert these light-colored quick-setting cements into dark-colored slow-setting cements. This I find can be accomplished by the addition either to the raw cement-rocks before calcination, to the burned rocks after calcination, or to the manufactured cement, of the ferruginous earths or stones above stated, which, as shown by chemical analysis, contain in addition to the iron from which they derive their color, silica and lime and other cement-making ingredients, and are, moreover, in many places found in near proximity to cement deposits, thus insuring economical working as well as an improved quality of cement. I do not, however, restrict myself to the ferruginous earths or stones found in the localities mentioned, because it is a well-known fact that they can be found in other localities, and I wish to be understood as embracing all such earths or stones within the limits of my invention.

In carrying my invention into practice I ascertain the setting qualities of the cement to be treated, and add to it the earths or stones above mentioned, or a mixture of both, in such proportions as to change it from a hot, quick-setting cement to a cool slow-setting one. In most cases, by the addition of from ten to fifteen per cent. of the materials in question the object will be attained, and the manufactured cement will be made slow-setting without material detriment to its ultimate strength, and will at the same time be made dark in color, resembling in many respects the dark-colored Rosendale cements.

As before stated, I do not confine myself to the addition of the ferruginous earths or stones to the manufactured cement above, but I can add them in powder or otherwise with equally good results at any stage of the manufacture, either to the raw cement-rocks before calcination, to the burned rocks before grinding or during that operation, or to the manufactured cement after grinding.

Having described my invention, and the ways of carrying it into practice, I state my claims as follows:

1. The improvement in the manufacture of hydraulic cement which consists in incorporating with quick-setting hydraulic cements, or the material from which said cements are made, ferruginous earths or stones of the character stated, in substantially the proportions specified.

2. The method of making a slow-setting hydraulic cement by mixing, in substantially the proportions stated, quick-setting cement-rocks, and ferruginous earths or stones of the character stated, and then calcining and subsequently grinding the same to a powder.

In testimony whereof I have hereunto signed mo name this 1st day of March, 1884.

ROBERT W. LESLEY.

Witnesses:
 EWELL A. DICK,
 J. WALTER BLANDFORD.